United States Patent [19]

Baltzer

[11] 4,150,364
[45] Apr. 17, 1979

[54] PARALLEL ACCESS MEMORY SYSTEM

[75] Inventor: Philip K. Baltzer, Princeton, N.J.

[73] Assignee: RCA Corporation, New York, N.Y.

[21] Appl. No.: 811,288

[22] Filed: Jun. 29, 1977

Related U.S. Application Data

[62] Division of Ser. No. 746,430, Nov. 29, 1976, Pat. No. 4,092,728.

[51] Int. Cl.² .................................... G06K 15/20
[52] U.S. Cl. .................................... 340/703; 340/707; 340/750; 340/799; 364/900; 365/220
[58] Field of Search ................. 340/324 A, 324 AD

[56] References Cited

U.S. PATENT DOCUMENTS

| | | | |
|---|---|---|---|
| 3,345,458 | 10/1967 | Cole et al. | 340/324 AD |
| 3,854,130 | 12/1974 | Ligocki | 340/324 AD |
| 3,891,890 | 6/1975 | Yasuda et al. | 340/324 A |

*Primary Examiner*—David L. Trafton
*Attorney, Agent, or Firm*—H. Christoffersen; Samuel Cohen; George J. Seligsohn

[57] ABSTRACT

Memory system having contiguous storage locations with sequential addresses is partitioned into units to permit separate unit write-in and parallel unit read-out, operations. Each unit is responsive to common word address signals and unique combinations of block address signals. In response to a control signal in a first of two possible states, the memory system operates in a conventional manner, i.e., data is read from or written to a particular location in the memory to or from a data bus, the address of the particular location being supplied over an address bus and having a block select portion and a word select portion. When the control signal is in its second state, each unit is responsive only to the word address signals to read data from or write data to common word locations in each unit simultaneously. Several utilization devices can be similarly arranged so that when the control signal is in the second state, each device is coupled directly to an associated one of the units and all units and devices are decoupled from the data bus. Another embodiment of the invention provides parallel memory access without switching elements. A system is also described which is especially adaptable to color television display of information.

4 Claims, 4 Drawing Figures

PARALLEL ACCESS MEMORY SYSTEM

This is a division, of application Ser. No. 746,430, filed 11/29/76, now U.S. Pat. No. 4,092,728.

This invention relates to data processing memories.

Memories used in data processing systems are designed to be accessed one word at a time. This results in a memory loading time equal to the product of the cycle time of the memory times the memory capacity, i.e., total number of words. (A word is the amount of data stored at a location and handled as a single unit.) When servicing fast character rate peripheral devices, the memory cycle time becomes a significant factor in limiting the number of such devices that can be used in the system. The limitation of accessing a word at a time is illustrated by the mapping of a display area in a memory onto a raster of a cathode ray tube or, as shown in Patent Application Ser. No. 722,584, of a standard television set. The above-referenced application shows that there are speed limitations in displaying a memory area on a black and white television raster; displaying a memory area onto a color set requires three times the number of memory accesses, i.e., one for each of the three color guns.

In this invention, a memory is addressed by signals partitioned into block address and word address signals. The memory is partitioned into units which, when enabled, transfer data between a location specified by the word address and data ports. Block decoders enable the unit addresssed by the block address signals. A control signal can also enable all units concurrently. The data ports are coupled to a data bus.

Figure 1:
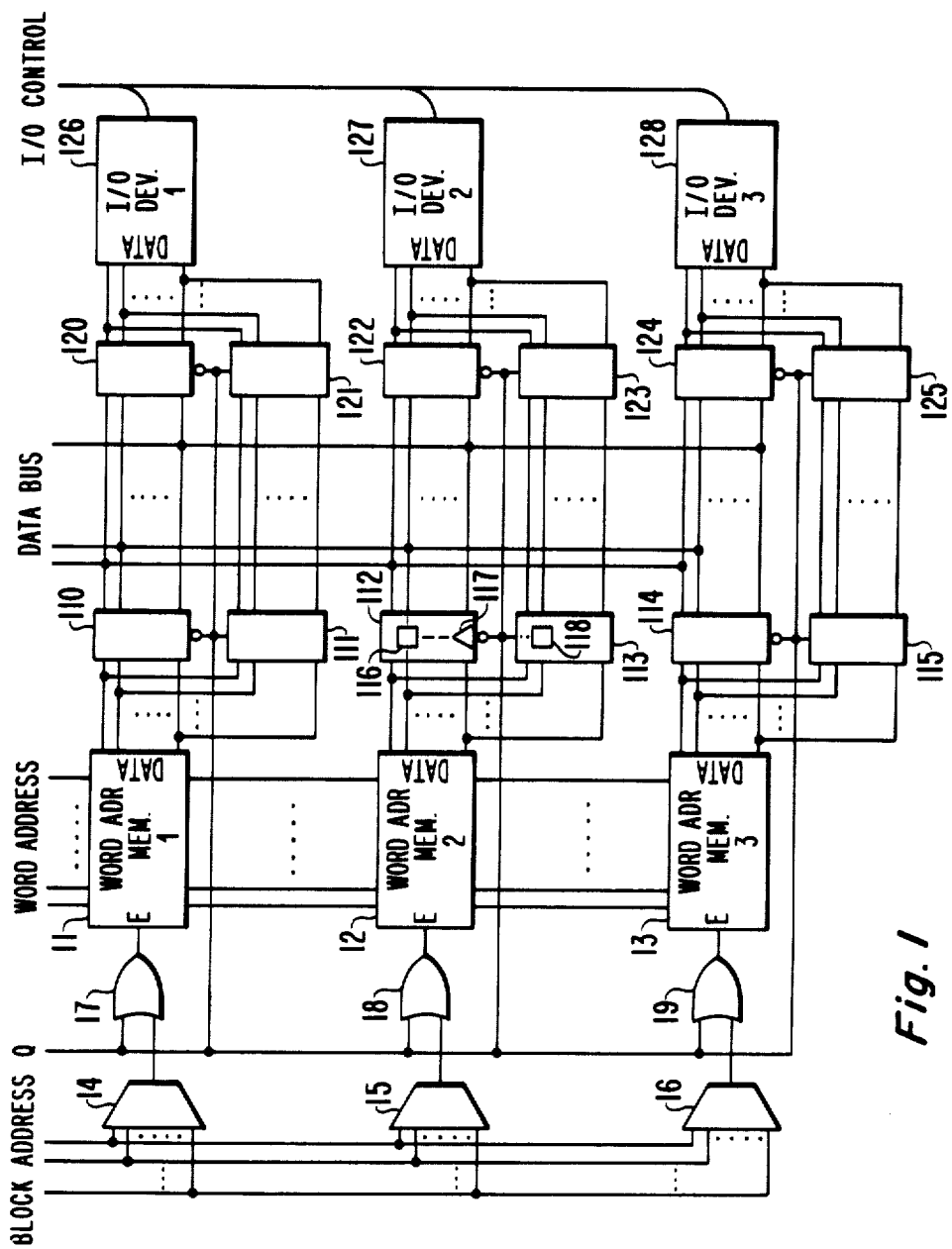
FIG. 1 is a block diagram of a partitioned memory system according to the invention.

For purposes of illustration, in FIG. 1, a data storage is divided into three units 11-13. The block address and word address lines together form the entire address to the data storage device so that in normal operation, the three blocks 11-13, operate as a single memory or memory system. Each of the units is responsive to the same word address. The block address for each unit is decoded each by a separate decoder 14-16. One of the decoders 14-16 is activated by the block address in normal operation and its output signal enables one of an associated group of OR gates 17-19, the output of which enable the selected memory units. The word in a selected unit is specified by the word address.

The OR gates 17-19 also have as an enabling input signal a special control, or Q, signal that can enable all the units 11-13 simultaneously. With the data output terminals of each unit coupled to the data bus, each unit could be loaded in parallel from the data bus. That is, data on the data bus could be stored at the same word address simultaneously when the Q signal is a logical one. (Reading simultaneously to a common data bus would result in the data word on the bus being the ORed words from each unit.)

The data lines associated with each memory block can be coupled to switching devices 110-115. The switching devices can be relays or, as shown in the switching devices 112 and 113, transmission gates operated by the Q signal. (For an example of suitable transmission gates, see integrated circuit type CD4016A (RCA Corporation).)

The Q signal during normal memory operation is a logical zero. The Q signal of logical zero activates the switching devices 110, 112, and 114. As shown in the switching device 112, the typical transmission gate 116 is turned on by the output signal from an included inverter 117 which is responsive to the logical zero value of the Q signal to supply a logical one signal. The inversion circle indicates an internal inverter such as the inverter 117. In the switching device 113, a transmission gate 118 is responsive to a logical one value of the Q signal. Therefore, when the Q signal is a logical zero, the data ports of the memory units 11-13 are coupled to the data bus through individual transmission gates at each port. All the transmission gates are responsive in a given switching device to the output signal of an inverter driven by the Q signal. When the Q signal is a logical one, the data ports are de-coupled from the data bus and coupled to the corresponding data ports of utilization ( or input/output) devices, one of which is associated with each memory unit 11-13 as explained in more detail below. (The term data ports refers to the terminals of devices — including memories — where data signals are received or transmitted by the device.)

A group of utilization devices 126-128 is coupled in a similar fashion to a group of switching devices 120-125. The data ports of the devices are coupled by switching devices 120, 122 and 124 to the data bus. When the Q signal is a logical zero, the utilization devices' data ports are coupled to the data bus and the system operates in the normal manner. When the Q signal is a logical one, each utilization device is coupled to an associated memory unit so that parallel data transfers can be accomplished to common word locations in each memory unit.

In the example where a memory display area is to be mapped onto the raster of a color television set as described above, the pattern for each color is stored in one of the memory units 11-13. The utilization devices 126-128 would be circuits similar to those described in the above-referenced patent application, i.e., a TV interface, one for each color gun of the displaying television set. With the memory units loaded, the Q signal is made a logical one to activate each of the OR gates 17-19 and to enable all of the memory units 11-13. At the same time, the logical one value of the Q signal disables the switching devices 110, 112, 114, 120, 122 and 124 and activates the switch devices 111, 113, 115, 121, 123, and 125. The switching devices now couple the data ports from each memory unit to the data ports of each associated utilization device. The word address locations are sequenced so that each memory unit is accessed through sequential locations and the data are coupled to the associated utilization devices in parallel.

When normal memory operation is to be resumed, the Q signal is made a logical zero. This couples the memory units 11-13 and the utilization devices 126-218 to the data bus, disconnects each memory unit from its associated utilization deices, and removes all the enabling inputs of the memory blocks via the OR gates 17-19.

The switching devices used in the circuit of FIG. 1 can be relays, transmission gates, or other electronic gates or switches that are well known in the art.

Figure 2:
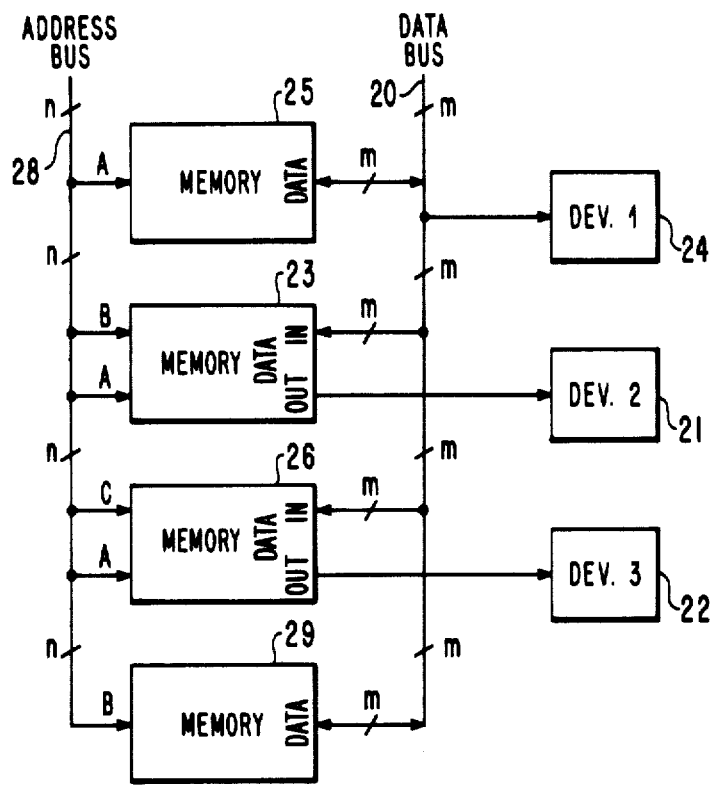
FIG. 2 is a block diagram of a second embodiment of the invention.

In FIG. 2, the memory is arranged so that parallel block accessing can be accomplished without using switching devices. A block of memory 25 is coupled to an address bus 28, comprising both word address and block address signals. The block and word addressing are done in the usual way, i.e., the word addresses are directly decoded and the block address is decoded to enable the output from the memory block.

A memory 23 is coupled to receive two block addresses as well as the word addresses. The memory 23 also receives input data at terminals different from the data output terminals. Such memory devices are commercially available; for example, see the integrated circuit type CDP1822SD (RCA Corporation).

Figure 4:
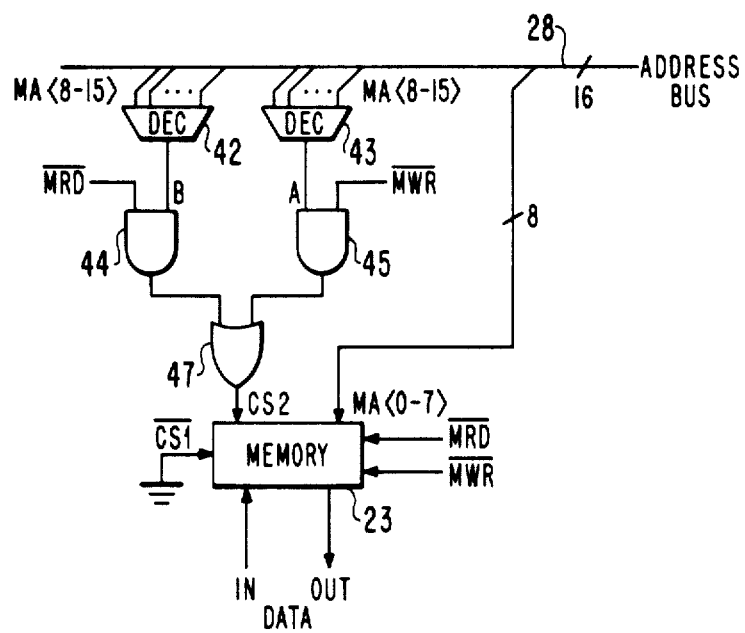
FIG. 4 is a logic diagram of an addressing circuit useful in the second embodiment of the invention.

FIG. 4 shows the detail of a circuit which can be used to couple the memory 23 (FIG. 2) to the address bus 28. The word lines from the address bus 28 are coupled directly to the memory module 23 at terminals provided therefore as shown in the data sheets for the CDP1822SD device. Although the address lines can be partitioned in any desired manner, in the example shown in FIG. 4, the address bus 28 is presumed to have sixteen lines, eight of which are the word address and the remaining eight comprising the block address. The block addresses are the most significant eight bits of the address. All combinations of block address bits need not be used, however.

The eight block address lines are coupled to two decoders 42 and 43. The decoders 42 and 43 are each responsive to a different combination of block address bits for producing an output signal to an AND gate. The decoder 42 produces an output signal in response to one block address to prime an AND gate 44 which is enabled by an $\overline{MRD}$ signal to produce an output signal to an OR gate 47. The decoder 43 produces an output signal in response to a different combination of block address bits to prime an AND gate 45 which is enabled by $\overline{MWR}$ signal to produce an output signal to the OR gate 47. The output signal from the OR gate 47 enables the memory 23, the other enabling signal being permanently connected to its activating voltage; in this example, $\overline{CS1}$ is coupled to a ground (logical zero) signal. The $\overline{MRD}$ signl is a logical one when data is being written into the memory 23. The signal $\overline{MWR}$ is a logical one when data is being read from the memory. The data to be stored in the memory is coupled to terminals different from those by which the data is read out. Therefore, the circuit as shown in FIG. 4 permits data to be written into the memory 23 at locations designated by one address and reading out the same data from the same locations but designated by a different (block) address from that used for writing.

Returning to the circuit of FIG. 2, the memory 25 is a standard memory, having only one decoder responsive to one block address. A third memory 26 is coupled to the address bus 28 in the same manner as described for the second memory 23. For purposes of illustration, the memory 25 is responsive to all word addresses in the address block designated A. The memory 23 is responsive to all word addresses in block A for reading out data and in block B for writing in data. (In FIG. 4, this means that the decoder 42 is responsive to block B and the decoder 43, to block A.)

The data terminals of the memory 25 are bidirectional and are coupled to a data bus 20 in the usual way. The data bus 20 is also coupled to the unidirectional DATA IN terminals of memories 23 and 26. The unidirectional DATA OUT terminals of the memories 23 and 26 are coupled to utilization devices 21 and 22, respectively. Another utilization device 24 is coupled to receive information from the data bus in the usual manner of an I/O peripheral device.

As described above, the utilization devices 21, 22 and 24 can be the three color circuits of a television receiver so that data stored in the memories 23, 25 and 26 can be displayed on a color television receiver by scanning in parallel the word addresses at designated block A and overlaying the three images to produce various colors as desired.

The normal operation of a system using the circuit of FIG. 2 would comprise loading the memories 23, 25 and 26 with information which is not necessarily the same, but which is to be displayed at the same point on the raster corresponding to a word address depending on the color at that point. The memory 25 is loaded by using word addresses in block A; memory 23, in block B; and memory 26, in block C. The data loaded into the memories is supplied over the data bus 20. When the information in the memories 23, 25 and 26 is to be displayed on a television raster (or used by other utilization devices), all the memories 23, 25 and 26 are responsive to the word addresses in block A. Since each receives the same word address signals, the data from the three memories is accessed in parallel.

When used with a computer or data processing system, the arrangement described above precludes the use by the system of all the available addressable memory locations. In other words, the data stored at word addresses in block B cannot be read onto the data bus 20 and thence to the system by the arrangement shown in FIG. 2. To permit full utilization of all addressable locations, memory 29 is added to the systm which is responsive to word addresses in block B in the same manner that memory 25 is responsive to those in block A. Thus, memories 23 and 29 will be loaded in parallel but a retrieval from memory 29 accomplished with a block B word address will not affect the memory 23 because the decoder 42 (FIG. 4) for block B provides an enabling signal to the memory only during a write instruction. Additional memories for block C and so on can be provided in the same manner.

Figure 3:
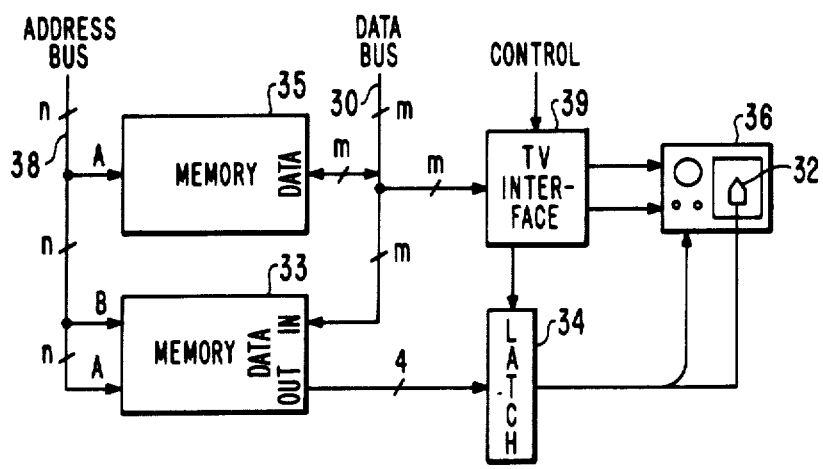
FIG. 3 is a block diagram of the second embodiment used with a television receiver.

In the system according to FIG. 3, a memory 35 and an auxiliary memory 33 are coupled to an address bus 38 described for the memories 23 and 25 in the circuit of FIG. 2. The main memory 35 has a full-width word. For example, the data output signals from the memory 35 are eight bits wide for a byte-oriented system, i.e., m has a value of eight. A TV interface circuit 39 for coupling the data bus to a standard television receiver 36 can be arranged as explained in detail in the above-referenced patent application Ser. No. 722,584. The output signals from the TV interface 39 are the spot luminance and composite synchronization signals to activate the circuits in the television receiver 35. To control the spot color, four bits of data, the width of the data word from the memory 33, could be used in the following way. Three of the bits used for color information permits eight color combinations to be specified. The fourth bit could be used to control a device such as a light pen 32.

As explained in the above patent application Ser. No. 722,584, the bits from the memory 35 are shifted in serial fashion from the interfacing circuit 39. Therefore, the output bits from the memory 33 could be stored in a latch circuit 34 during the time that the associated bits from the main memory 35 are being displayed on the raster of the television receiver 36. The latch control signal is taken from the interfacing circuit 39 and corresponds to the time the information is taken from the data bus 30 by the interfacing circuit 39.

The number of bits and memories can be varied from the values described above for purposes of illustration or by way of example in the explanation. Various other modifications to the systems and circuits described and illustrated to explain the concepts and modes of practicing the invention can be made by those of ordinary skill in the art within the principles or scope of the invention as expressed in the appended claims.

What is claimed is:

1. In a system for displaying information stored in a storage space, said system including address bus means for distributing address signals, data bus means for distributing data signals, main memory means having addressed storage locations coupled to said address bus means and said data bus means for both storing from and retrieving to said data bus information to be displayed in response to a first set of address signals on said address bus, and display means coupled to said data bus for displaying information retrieved from said main memory means, the improvement comprising:

auxiliary memory means having addressed storage locations coupled to said address bus means and having first data terminal means coupled to said data bus for receiving data to be stored at addressed storage locations thereof in response to a second set of address signals on said address bus, and second data terminal means coupled to said display means for transmitting data from said addressed storage locations thereof to said display means in response to said first set of address signals on said address but to modify the information to be displayed.

2. The invention claimed in claim 1 wherein said display device is a television receiver.

3. The invention claimed in claim 2 wherein said modifying information determines the color of said display.

4. The invention claimed in claim 1 including latching means between said second terminal means and said display means for temporarily storing said transmitted data.

* * * * *